(12) United States Patent
Matsumoto et al.

(10) Patent No.: US 11,222,745 B2
(45) Date of Patent: Jan. 11, 2022

(54) COIL AND NON-CONTACT POWER SUPPLY DEVICE

(71) Applicant: SWCC SHOWA CABLE SYSTEMS CO., LTD., Kawasaki (JP)

(72) Inventors: Hideki Matsumoto, Kawasaki (JP); Kiyoshi Miura, Kawasaki (JP); Kentaro Nouchi, Kawasaki (JP)

(73) Assignee: SWCC SHOWA CABLE SYSTEMS CO., LTD., Kawasaki (JP)

( * ) Notice: Subject to any disclaimer, the term of this patent is extended or adjusted under 35 U.S.C. 154(b) by 0 days.

(21) Appl. No.: 16/900,228

(22) Filed: Jun. 12, 2020

(65) Prior Publication Data

US 2020/0312546 A1    Oct. 1, 2020

Related U.S. Application Data

(63) Continuation of application No. PCT/JP2018/046588, filed on Dec. 18, 2018.

(30) Foreign Application Priority Data

Dec. 18, 2017  (JP) .............................. JP2017-242081

(51) Int. Cl.
*H02J 50/10* (2016.01)
*H01F 38/14* (2006.01)
*B60L 53/12* (2019.01)

(52) U.S. Cl.
CPC .............. *H01F 38/14* (2013.01); *B60L 53/12* (2019.02); *H02J 50/10* (2016.02)

(58) Field of Classification Search
CPC .. H01F 38/14; H01F 27/2871; H01F 27/2823; H01F 27/361; H02J 50/10;
(Continued)

(56) References Cited

U.S. PATENT DOCUMENTS

| 6,922,128 B2 * | 7/2005 | Vilander ............. H01F 17/0006 257/531 |
| 9,035,423 B1 * | 5/2015 | Tsukahara ............... H01L 28/10 257/531 |
| 2004/0172806 A1 | 9/2004 | Yoshimori |
| 2010/0277004 A1 | 11/2010 | Suzuki et al. |

(Continued)

FOREIGN PATENT DOCUMENTS

| CN | 1545711 A | 11/2004 |
| CN | 103339698 A | 10/2013 |

(Continued)

OTHER PUBLICATIONS

First Office Action in corresponding Chinese Patent Application No. 201880081465.0, dated Jun. 2, 2021, with English translation.

(Continued)

*Primary Examiner* — Pinping Sun
(74) *Attorney, Agent, or Firm* — Harness, Dickey & Pierce, P.L.C.

(57) ABSTRACT

A coil according to one embodiment of the present invention is a coil in which a first electric wire on an inner peripheral side and a second electric wire on an outer peripheral side are wound side by side to connect ends of the electric wires with each other, and the coil includes a first region where the first electric wire abuts on the second electric wire of another adjacent turn and separates from the second electric wire of a same turn.

6 Claims, 6 Drawing Sheets

(58) Field of Classification Search
CPC ...... H02J 2310/48; B60L 53/12; Y02T 90/14; Y02T 10/7072; Y02T 10/70; B60M 7/00
See application file for complete search history.

(56) References Cited

U.S. PATENT DOCUMENTS

| | | | |
|---|---|---|---|
| 2014/0084697 A1 | 3/2014 | Yasuda et al. | |
| 2015/0145635 A1 | 5/2015 | Kurz et al. | |
| 2015/0244203 A1* | 8/2015 | Kurz | H02J 50/005 320/108 |
| 2017/0040688 A1* | 2/2017 | Peralta | H01Q 1/526 |

FOREIGN PATENT DOCUMENTS

| | | |
|---|---|---|
| CN | 105934804 A | 9/2016 |
| JP | H6-310324 A | 11/1994 |
| JP | H06310324 A * | 11/1994 |
| JP | 2007-201199 A | 8/2007 |
| JP | 2009-158598 A | 7/2009 |
| JP | 2012-039831 A | 2/2012 |
| JP | 2013-229401 A | 11/2013 |
| JP | 2015-518269 A | 6/2015 |
| JP | 2016-539516 A | 12/2016 |
| JP | 2017-017874 A | 1/2017 |
| WO | WO-2013/141718 A1 | 9/2013 |
| WO | WO-2015-077782 A1 | 5/2015 |

OTHER PUBLICATIONS

Notice of Reasons for Refusal in corresponding Japanese Patent Application No. 2019-016855, dated Jul. 20, 2021, with English translation.

* cited by examiner

COIL AND NON-CONTACT POWER SUPPLY DEVICE

CROSS-REFERENCE TO RELATED APPLICATION

The present application is a continuation application of International Application No. PCT/JP2018/046588, filed Dec. 18, 2018, which claims priority to Japanese Patent Application No. 2017-242081, filed Dec. 18, 2017; the entire contents of all of which are incorporated herein by reference.

FIELD

The present invention relates to a coil and a non-contact power supply device.

BACKGROUND

In recent years, to power supply for an electric vehicle (EV) and a plug-in hybrid vehicle (PHV), the study of application of a non-contact type using a wireless power transmission technique in addition to a contact type using a cable is also in progress.

A technique for non-contact power supply is a technique for, for example, supplying power to the electric vehicle by wirelessly transmitting power while facing a planar coil (ground-side coil) for power transmission (primary side) provided so as to be embedded in a road surface of a power supply station and a planar coil (vehicle-side coil) for power reception (secondary side) provided at the bottom of the electric vehicle at an interval of about several tens of centimeters.

The non-contact power supply is required for its transmission efficiency to be high, and a coil used for the non-contact power supply is also required for a loss to be reduced. Accordingly, these days, various measures are taken to reduce a copper loss, namely, to reduce alternating-current resistance for the coil used for the non-contact power supply.

As factors that affect the alternating-current resistance of the coil, the following two factors are considered. A first factor is direct-current resistance depending on a conductor cross-sectional area of a winding wire rod, and a second factor is a loss caused by a proximity effect and a skin effect which vary depending on a frequency, a twist configuration of a wire rod, a coil form, and the like.

Because the non-contact power supply is used at high-frequency bands of kHz order in particular, the effect of the second factor becomes large. A coil using a Litz wire for a wire rod and, as a form of the coil, being wound while providing a gap between turns of the wire (hereinafter, this is called "gap winding coil") is considered suitable for reducing the effect of the second factor.

In consideration of the above circumstances, a conventional coil used for the non-contact power supply is required to be formed by winding the Litz wire (insulated conductor) formed by twisting a plurality of thin enameled wires in a spiral shape in a planar manner and winding it while providing a gap between turns of the wire. As a conventional technique for providing the gap between turns of the wire of the coil, for example, there is known a technique for providing a spacer between adjacent turns of the wire (refer to Patent Document 1, for example).

For example, because the planar coils for the non-contact power supply for the electric vehicle called EV or the like are required to be capable of transmitting power securely and efficiently against positional displacement between the power transmission-side coil (installed in a power transmission/power supply station) and the power reception-side coil (mounted on the bottom of the electric vehicle), their respective shapes are standardized to certain sizes.

When the coils are actually installed in the electric vehicle and the power supply station, a shape, an outer shape, an inside diameter, and the number of turns of the coils, and the like are specified, thus requiring formation of the coils which retain strength for coil shape retention as well as restrain a loss by reducing alternating-current resistance of the coils within the specified ones.

The conditions of a coil for non-contact power supply for EV which are being summarized at present are likely to be in ranges where, for example, an outer shape of the coil is 250 mm to 600 mm and an inside diameter of the coil is about 100 mm to 200 mm. Further, there is a desire to also make a thickness of the coil as small as possible from the viewpoint of space saving. Specifically, there is a desire to set the thickness of the coil to, for example, 5 mm or less. Moreover, regarding the number of turns of the coil, because a transmission frequency is defined to be 85 kHz, the number of turns is about 8 to 22 turns in terms of an inductance to resonate with respect to this frequency.

Incidentally, even though a matter of providing a gap between turns of the wire is simplified, the work to convey a product as the coil and to move the coil also during manufacturing is performed, and variations in inductance of the coil are suppressed, in a manufacturing site, thus requiring the product in consideration of shape retention and handleability also after manufacturing the coil.

Under the constrain of the coil shape as described above, in order to reduce the previously-mentioned alternating-current resistance, there is proposed a coil, after dividing one wire rod into two, wound apart from and in parallel with each other, what is called, a coil having a form of parallel gap winding.

However, since the coil having a form of parallel gap winding is provided with a gap between turns of a wire, it is difficult for only the coil to retain its shape.

This requires such measures for the shape retention as to sandwich the coil with a shape retaining tool such as a spacer or a bobbin or as to wind the coil therearound, which cause rising cost in manufacturing and in transporting.

Further, because a difference occurs in line lengths between an inside wire rod and an outside wire rod when a pair of two wire rods is wound in a planar manner, in a case of forming a coil having, for example, an outside diameter of 500 mm×650 mm, a winding width of 180 mm, and the number of turns of eight turns, the line length is about 12 meters, and a line length difference of about 60 cm occurs between the inside wire rod and the outside wire rod, resulting in that an electrical characteristic such as alternating-current resistance deteriorates due to a phase difference caused by the line length difference.

Thus, the present invention has been made to solve the above problems, and it is an object to provide a non-contact power supply device and a coil which conform to predetermined dimensions and shape and a predetermined electrical characteristic, are low in cost, and have good handleability.

SUMMARY

To achieve the above object, a coil according to one embodiment of the present invention is a coil in which a first electric wire on an inner peripheral side and a second electric wire on an outer peripheral side are wound side by side to connect ends of the electric wires with each other, and the coil includes a first region where the first electric wire abuts on the second electric wire of another adjacent turn and separates from the second electric wire of a same turn.

A non-contact power supply device according to one embodiment of the present invention includes: a board made of metal or made of resin; and the coil disposed directly on the board or with a magnetic core plate interposed therebetween.

According to the present invention, it is possible to provide a coil and a non-contact power supply device which conform to predetermined dimensions and shape and a predetermined electrical characteristic, are low in cost, and have good handleability.

DETAILED DESCRIPTION

Hereinafter, embodiments of the present invention will be explained based on the drawings.

A non-contact power supply system is configured to dispose a non-contact power supply device on a primary side (power transmission side) and a non-contact power supply device on a secondary side (power reception side) to face each other. In the non-contact power supply device on the primary side being a side on which power is supplied and the non-contact power supply device on the secondary side being a side on which power is received, elements of parts of coils are composed of almost the same elements, and here, one side is explained, and it goes without saying that the other side is also similar.

First Embodiment

Figure 1:
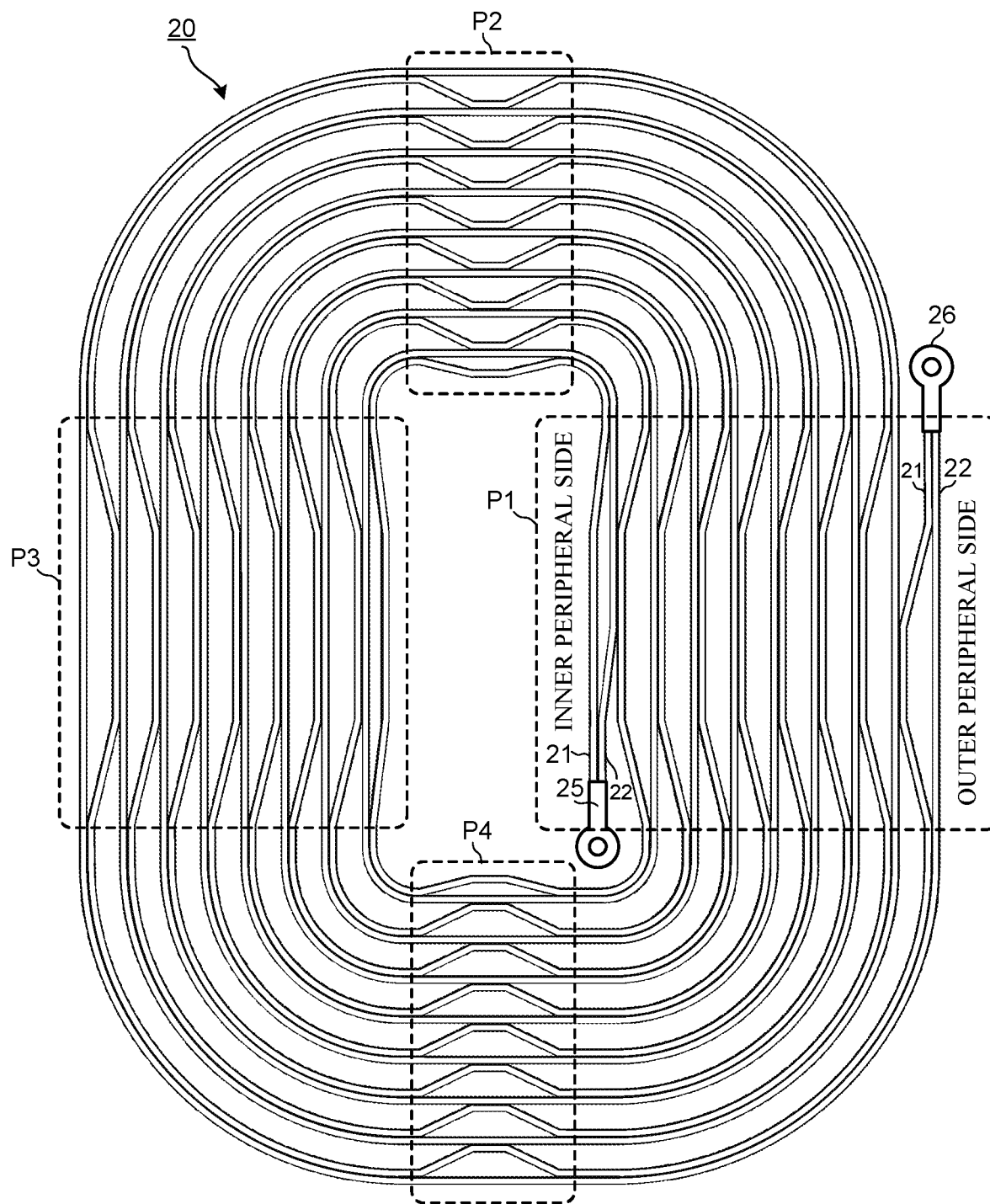
FIG. 1 is a plan view of a spiral-shaped coil (para hybrid winding) of a first embodiment according to the present invention.
Figure 2:
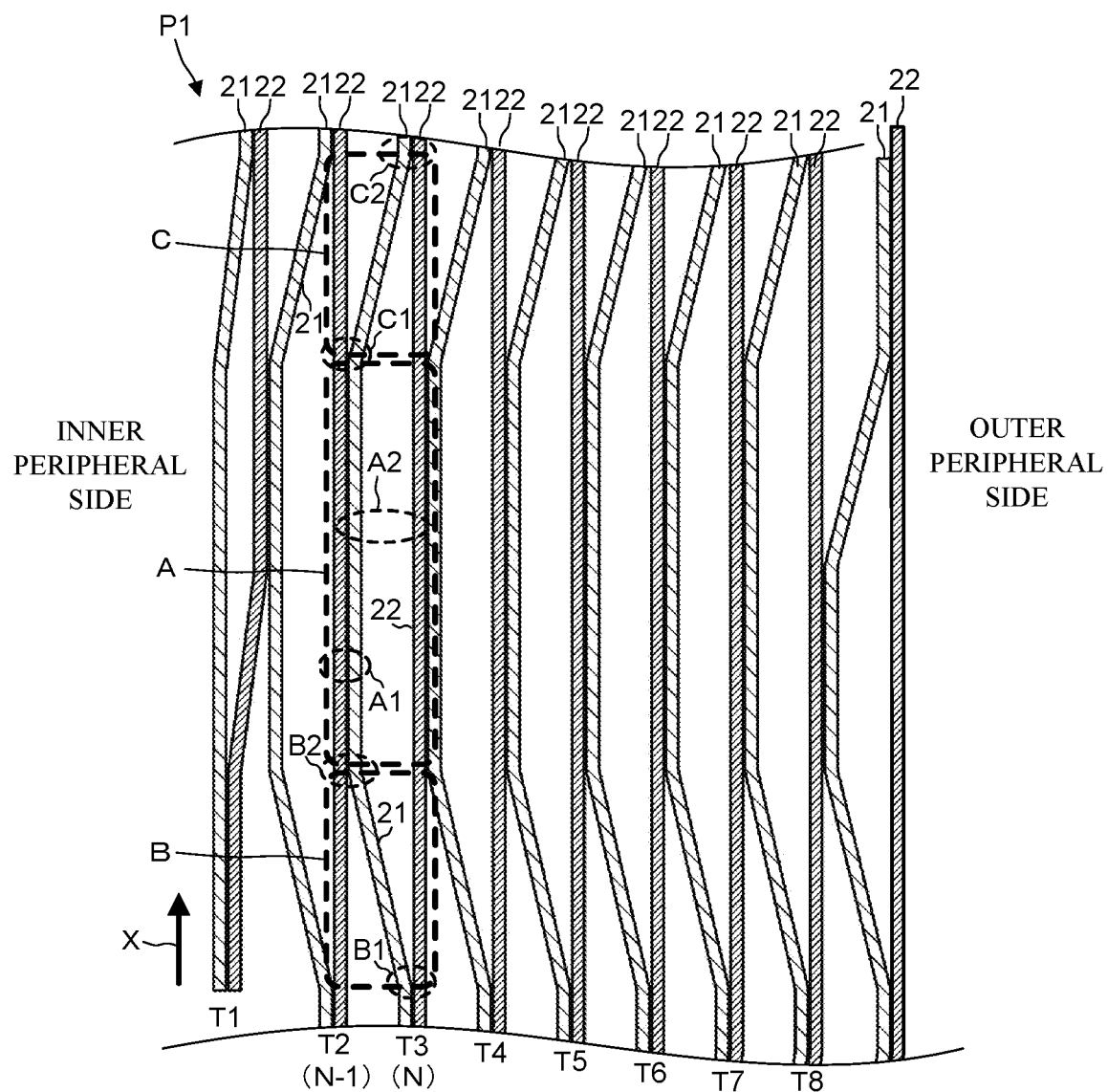
FIG. 2 is an enlarged view schematically (linearly) illustrating a substantial part of the coil in FIG. 1.

Hereinafter, a coil 20 of a first embodiment according to the present invention is explained with reference to FIG. 1 and FIG. 2. FIG. 1 is a plan view of a spiral-shaped coil (para hybrid winding) of the first embodiment according to the present invention, and FIG. 2 is an enlarged view of a substantial part (a zone P1 of zones P1 to P4).

As illustrated in FIG. 1, the coil 20 of the first embodiment according to the present invention is a coil which is formed (manufactured) in a spiral shape by arranging a pair of two Litz wires 21, 22 as electric wires or insulated conductors in a planar manner and winding them from an inner peripheral side to an outer peripheral side, and has a substantially rectangular (corner portions are rounded) outer shape in which ends of the Litz wires 21, 22 are combined (connected). The coil in this shape is installed, for example, on the primary side (power transmission side or power supply side), specifically, for example, in a road surface of a charging station for EVs. To arrange the Litz wires 21, 22 in a planar manner means a state of arranging them on a surface crossing (orthogonal to) the winding axis.

The Litz wires 21, 22 each have a wire diameter of, for example, about 5 mm, and a crimp terminal 25 is provided at one ends on the inner peripheral side of the Litz wires 21, 22 to connect the Litz wires 21, 22 with each other. Further, a crimp terminal 26 is provided at one ends on the outer peripheral side of the Litz wires 21, 22 to connect the Litz wires 21, 22 with each other. That is, both ends of the Litz wires 21, 22 are combined (connected) by the crimp terminals 25, 26, and a cross-sectional area equal to one thick electric wire is secured by the two (pair of) wires, which are wound flat, thereby contributing to reduction in thickness of the coil 20.

In the coil 20, the two Litz wires 21, 22 are wound to the outer peripheral side in order such that a winding start on the inner peripheral side is a first turn T1, the next round is a second turn T2 . . . , and the last round is an eighth turn T8, and for example, when a third turn T3 is set as an Nth turn, the second turn T2 is an N−1th turn. Note that N is set to an integer of 2 or more.

In this example, the example of winding the two Litz wires 21, 22 from the inner peripheral side to the outer peripheral side has been explained, but they may be wound from the outer peripheral side to the inner peripheral side. In this case, a winding start on the outer peripheral side is a first turn T1, the next round is a second turn T2 . . . , and the last round is an eighth turn T8, and the order of the round, the order of the turn, and the turn number are different in expressions. In a case of the winding from the outer peripheral side to the inner peripheral side, when a reference sign T3 in FIG. 2 is set as the Nth turn, a reference sign T2 is an N+1th turn.

The coil 20 is the one in which the Litz wire 22 on the outer peripheral side of the two adjacent Litz wires 21, 22 is wound in a spiral shape at regular intervals and the Litz wire 21 on the inner peripheral side is wound so as to regularly and repeatedly abut on and separate from the adjacent Litz wire 22 on the inner peripheral side and/or the outer peripheral side in a winding direction.

Note that in this example, the first turn T1 is excluded from consideration of regularity because end portions (portions where a form of the winding start is not stable) of the Litz wires 21, 22 are included.

In other words, in the coil 20, while the pair of Litz wires 21, 22 whose ends are combined is arranged flat to be wound, the Litz wire 22 on the outer peripheral side is wound at regular intervals, and in the interval of the Litz wire 22, the Litz wire 21 on the inner peripheral side is disposed to meander so as to regularly and repeatedly abut on and separate from the adjacent Litz wire 22. To be regular means to bend and bend back the Litz wire 21 at regular lengths, intervals, and angles in certain zones in one round.

The coil 20 is wound forward while mixing a portion "close-winding portion" where the pair of two Litz wires 21, 22 (electric wires) abuts on each other and a portion "gap-winding portion" where the pair of two Litz wires 21, 22 (electric wires) separates from each other, thus calling this winding manner "parallel hybrid winding". The winding manner is sometimes called para hybrid winding, PH winding, or the like as an abbreviated name of the parallel hybrid winding.

In short, in the coil 20, the Litz wire 22 on the outer peripheral side is disposed in a spiral shape at regular intervals, and in the interval of the Litz wire 22, the Litz wire 21 on the inner peripheral side is disposed to meander so as to repeatedly abut "close-winding portion" on and separate "gap-winding portion" from the adjacent Litz wire 22.

In formation of the coil 20, the two Litz wires 21, 22 are fitted, in order from the inner peripheral side, into a winding jig (a metal mold or a resin mold) having a plate shape and formed with a spiral-shaped groove, thereby enabling formation of the coil 20 in which the two Litz wires 21, 22 are wound in a spiral shape in a planar manner.

Because the coil 20 only wound in a spiral shape in a planar manner comes apart when taken out of the winding jig or during transporting, an adhesive is distributed in a state in FIG. 1 where the Litz wires are fitted into the winding jig, to bond abutting portions on the wound wires to each other, and the coil is left as it is for a fixed time until the adhesive solidifies, thereafter performing handling.

For the bonding of the abutting portions, other than the above, for example, the Litz wires 21, 22 around each of which heat-fusible fiber is wound may be used to perform bonding by heating, a self-fusing wire provided with a self-fusing layer on the outermost layer may be used to perform thermal welding or solvent bonding, and the Litz wires 21, 22 may be wound with acetate yarn and coated with a solvent, thereby performing bonding.

In short, in the coil 20, the two adjacent Litz wires 21, 22 are wound while being arranged flat from the inner peripheral side to the outer peripheral side, and separating portions and abutting portions are provided regularly between the wires, to form a spiral shape as a whole, and for the purpose of shape retention, the portions where the wires abut on each other are bonded (fixed) with the adhesive or by welding, and moreover, the respective crimp terminals 25, 26 are connected with both ends of the Litz wires 21, 22. The crimp terminals 25, 26 may be attached to the both ends either before bonding or after bonding, and the attachment after winding is better because the two wire rods are required to match their lengths.

The Litz wires 21, 22 are each a wire group formed by twisting a plurality of enameled wires into a bundle. Note that in this example, the Litz wires 21, 22 are used, and as an electrically conductive wire other than the Litz wires 21, 22, for example, a conductor (wire made of copper or aluminum as a material) not subjected to insulation coating, a self-fusing wire provided with a self-fusing layer on an outermost layer, or the like may be used.

The crimp terminal 25 is connected with one ends on the inner peripheral side of the Litz wires 21, 22, and roughly composed of a crimp portion and a fixing portion provided with a hole for fixing. The crimp portion is composed by a cylindrical metal member, and by inserting conductive portions of the Litz wires 21, 22 therein to be subjected to caulking, the wire rods and a metal part are crimped to be integrated with each other, resulting in fixing the crimp terminal 25 to the Litz wires 21, 22. The crimp terminal 26 is connected with one ends on the outer peripheral side of the Litz wires 21, 22, and is the same as the crimp terminal 25, and the caulking is also performed thereon in the same manner.

As illustrated in FIG. 2, the coil 20 is wound so as to form three regions A, B, C in each of the predetermined zones P1 to P4 in one round of winding. In this example, the three regions A, B, C are provided in each of the four zones P1 to P4 excluding the corner portions of the substantially rectangular coil 20. The region A is called a first region, the region B is called a second region, and the region C is called a third region. Further, in the same view, a reference sign X indicates a direction of winding the two Litz wires 21, 22 forward (winding direction) in forming the coil 20.

For example, in the zone P1, when attention is paid to the Nth turn (for example, the third turn T3 counted from the first turn T1 on the inner peripheral side) and to the (N−1)th turn (the second turn T2 counted from the first turn T1 on the inner peripheral side) from the winding start, the region A is a region having an abutting section A1 where the Litz wire 21 on the inner peripheral side of the third turn T3 abuts on the Litz wire 22 on the outer peripheral side of the second turn T2 and a separating section A2 where the Litz wire 21 on the inner peripheral side of the third turn separates from the Litz wire 22 on the outer peripheral side of the third turn. Note that N is set to an integer of 2 or more in this case.

In short, the region A is the region where the Litz wire 21 abuts on the Litz wire 22 having another adjacent turn number and separates from the Litz wire 22 having the same turn number. Note that the turn number corresponds to the order of the turn. In other words, the region A can be said to be the region where the Litz wire 21 of the Nth turn excluding the winding start portion of an innermost periphery abuts on the Litz wire 22 of the adjacent turn on the inner peripheral side of the Nth turn and separates from the Litz wire 22 of the Nth turn (N: an integer of 1 or more).

The region B is a region where the Litz wire 21 on the inner peripheral side of the Nth turn (the third turn T3) crosses in a direction of being wound forward from an abutting section B1 on the Litz wire 22 on the outer peripheral side of the Nth turn (the third turn T3) to an abutting section B2 on the Litz wire 22 on the outer peripheral side of the (N−1)th turn (the second turn T2).

The region C is a region where the Litz wire 21 on the inner peripheral side of the Nth turn (the third turn T3) crosses in a direction of being wound forward from an abutting section C1 on the Litz wire 22 on the outer peripheral side of the (N−1)th turn (the second turn T2) to an abutting section C2 on the Litz wire 22 on the outer peripheral side of the Nth turn (the third turn T3). In being wound forward from the inner peripheral side to the outer peripheral side, the regions A to C are formed in order of the region B, the region A, and the region C.

Subsequently, performance will be explained in the contrast between the coil 20 of the first embodiment (para hybrid winding in FIG. 1) and a comparative example (a coil in which the two Litz wires are wound in a spiral shape in parallel while providing a gap at regular intervals (hereinafter, this is called "para gap winding")) with reference to FIG. 3.

The para gap winding is a coil in which the two Litz wires are wound in a spiral shape in parallel while providing a gap at regular intervals. The para gap winding is a standard coil as a sample in which the two Litz wires are spaced at a predetermined interval for each one turn, and it is desirable that coil performance (characteristic) of the para gap winding is regarded as a prescribed value, to which a value is as close as possible.

As a test condition, regarding each of the above-described two samples (the para gap winding and the para hybrid winding), both ends of each of the coils are connected with an existing LCR meter, and the frequency is changed from 0 to 200 kHz to measure alternating-current resistance. A value at the position where the frequency is "0" (zero) in FIG. 3 (about 15 mΩ) indicates a direct-current resistance.

Figure 3:
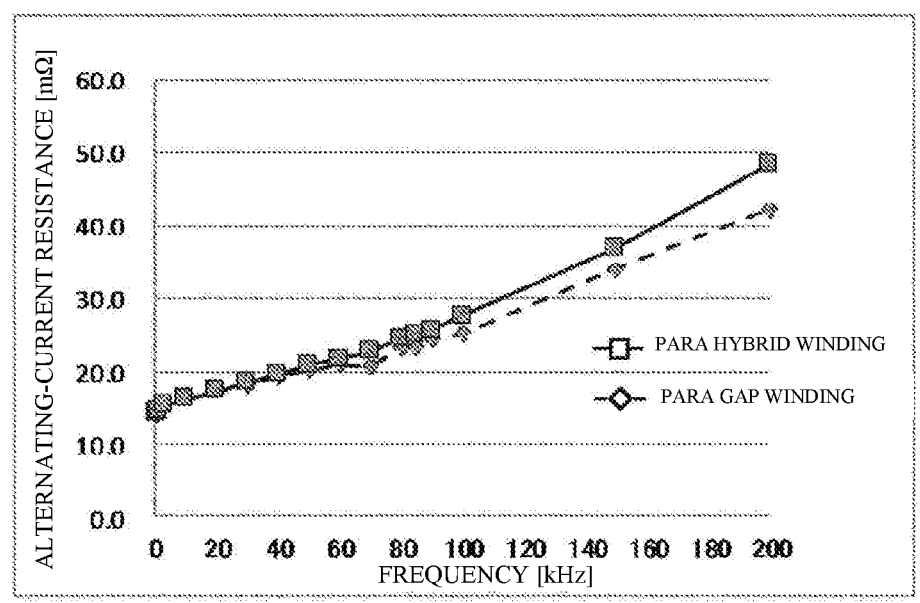
FIG. 3 is a frequency-alternating-current resistance characteristic chart of the coil in FIG. 1.

With reference to the measured result in FIG. 3, it is found that in an 85 kHz band being a use frequency of non-contact power supply for EV, the para hybrid winding of the present invention, whose alternating-current resistance is 30 mΩ or less, has a characteristic equal to that of the standard para gap winding, and predetermined electrical performance can be obtained.

Hereinafter, a manufacturing method of the coil 20 illustrated in FIG. 1 will be explained.

In the case of the coil 20, by fitting the two Litz wires 21, 22 in order into the winding jig formed with a spiral-shaped groove, the two Litz wires 21, 22 are wound in a spiral shape in a planar manner.

While the two Litz wires 21, 22 are wound flat in a spiral shape from the inner peripheral side to the outer peripheral side by using the winding jig, there are formed the regions A, B, C where the Litz wire 22 on the outer peripheral side is wound at regular intervals, and the Litz wire 21 on the inner peripheral side repeatedly abuts on and separates from the adjacent Litz wire 22.

In winding the Litz wires 21, 22 forward from the inner peripheral side, an exception is made in the first turn T1 (first round) of the winding start to regularity of the winding manner in order to adjust an interval between the Litz wires 21, 22 so as to allow the Litz wire 22 on the outer peripheral side to be wound in substantially parallel at regular intervals subsequently to the second turn T2.

When attention is focused on the third turn T3 (third round), for example, in the region B in FIG. 2, from the abutting section B1 where the Litz wire 21 and the Litz wire 22 abut on each other, the Litz wire 22 on the outer peripheral side remains straight to go forward, and only the Litz wire 21 on the inner peripheral side is inclined and wound forward in the left direction in facing the drawing, separates from the Litz wire 22 of the same turn T3, and abuts on the Litz wire 22 on the outer side of the second turn T2 at the abutting section B2.

Then, in a zone of the region A from the abutting section B2, the Litz wire 21 on the inner side of the third turn and the Litz wire 22 on the outer side of the second turn remain abutting on each other to be wound forward. In the zone of the region A, a state where the Litz wire 21 on the inner side of the third turn and the Litz wire 22 on the outer side of the third turn which is twinned with this Litz wire 21 separate from each other is kept.

From the abutting section C1 shifting from the region A to the region C, from the Litz wire 22 on the outer peripheral side of the second turn T2 which is wound forward in a straight line, the Litz wire 21 on the inner peripheral side of the third turn T3 is inclined and wound forward in the right direction in facing the drawing, and abuts on the Litz wire 22 of the same third turn T3 at a position of the abutting section C2. The winding is performed in this manner until the eighth turn T8 (eighth round) subsequently thereto. Note that the ninth turn (ninth round) of the outermost periphery is not included in the number of turns due to being a lead-out wire for terminal connection.

Thus, there are formed the region A (first region) where the Litz wire 21 on the inner peripheral side of the Nth turn excluding the innermost periphery abuts on the Litz wire 22 on the outer peripheral side of the (N−1)th turn and separates from the Litz wire 22 of the Nth turn, the region B (second region) where the Litz wire 21 on the inner peripheral side of the Nth turn crosses in a direction of being wound forward from the abutting section B1 on the Litz wire 22 on the outer peripheral side of the Nth turn to the abutting section B2 on the Litz wire 22 on the outer peripheral side of the (N−1)th turn, and the region C (third region) where the Litz wire 21 on the inner peripheral side of the Nth turn crosses in a direction of being wound forward from the abutting section C1 on the Litz wire 22 on the outer peripheral side of the (N−1)th turn to the abutting section C2 on the Litz wire 22 on the outer peripheral side of the Nth turn (N: an integer of 2 or more). Note that in this winding manner, the regions A to C are formed in order of the region B (second region), the region A (first region), and the region C (third region).

After winding, by bringing one ends on the inner peripheral side of the Litz wires 21, 22 together to put the crimp terminal 25 thereon and subjecting them to caulking, the wire rods and the metal part are crimped to be integrated with each other, resulting in connecting end portions (ends) of the Litz wires 21, 22 with each other. Further, by bring one ends on the outer peripheral side of the Litz wires 21, 22 together to put the crimp terminal 26 thereon and subjecting them to caulking, the wire rods and the metal part are crimped to be integrated with each other, resulting in connecting end portions (ends) of the Litz wires 21, 22 with each other. Thus, both ends (ends) of the two Litz wires 21, 22 are combined (connected) with each other to secure a cross-sectional area equal to one thick electric wire.

For the purpose of shape retention of the coil 20 formed as described above, an adhesive is distributed in a state of being fitted into the winding jig to bond abutting portions of the wound wires to each other, and the coil is left as it is for a fixed time until the adhesive solidifies, thereafter performing handling, namely, removal from the winding jig. Note that either of the processing of the end portions of the Litz wires 21, 22 and the bonding of the abutting portions may be performed first.

According to the first embodiment as described above, in winding, side by side, the two (pair of) Litz wires 21, 22 whose both ends are connected, the Litz wire 21 on the inner peripheral side is wound to meander with respect to the linearly wound Litz wire 22 on the outer peripheral side, thereby making it possible to adjust line lengths so as to reduce a line length difference between the wire rods on the outer peripheral side and the inner peripheral side.

Specifically, by adopting such a winding manner as to wind the Litz wire 22 on the outer peripheral side in substantially parallel at regular intervals and make the Litz wire 21 on the inner peripheral side meander in this interval to repeatedly abut on and separate from the adjacent Litz wire 22 (para hybrid winding), to make an adjustment so as to reduce the line length difference between the pair of Litz wires 21, 22, it is possible to improve an electrical characteristic which deteriorates due to a phase difference caused by the line length difference.

In a case of forming a coil having an outside diameter of 500 mm×650 mm, a winding width of 180 mm, and the number of turns of eight turns, the line length is about 12 meters, and it has been possible to reduce the line length difference between the Litz wires 21, 22 to about 8 cm at a connection portion of the crimp terminal 26 in the outermost peripheral portion (incidentally, a line length difference occurs by about 60 cm in conventional para gap winding).

Further, bonding the abutting sections of the Litz wires 21, 22 adjacent to each other enables the shape retention in which a gap is provided between the wires without providing a shape retaining tool such as a spacer or a bobbin.

As a result, it is possible to provide a non-contact power supply device and a coil which conform to predetermined dimensions and shape (shape in which the pair of two Litz wires 21, 22 is wound side by side while providing a gap in a range of predetermined outer shape and inner shape) and a predetermined electrical characteristic, are low in cost, and have good handleability.

In the first embodiment, in winding the two Litz wires 21, 22 whose both ends are connected, there is adopted such a winding manner as to make the Litz wire 21 on the inner peripheral side meander to repeatedly abut on and separate from the Litz wire 22 on the outer peripheral side (para hybrid winding), and the region A (refer to FIG. 2) or the regions A, B, C may be disposed for each certain angular range divided at regular intervals from a winding center in a radial direction.

In addition, in the first embodiment, the total number of turns of the coil 20 is set to eight turns T1 to T8 (eight-round turns), but even the number of turns and a coil shape other than the above can be said to be in scope of application of the invention of the present application. For example, in this example, a total of the number of turns is set as an even number, but may be set as an odd number, and the number of turns itself may be increased or decreased.

Second Embodiment

Figure 4:
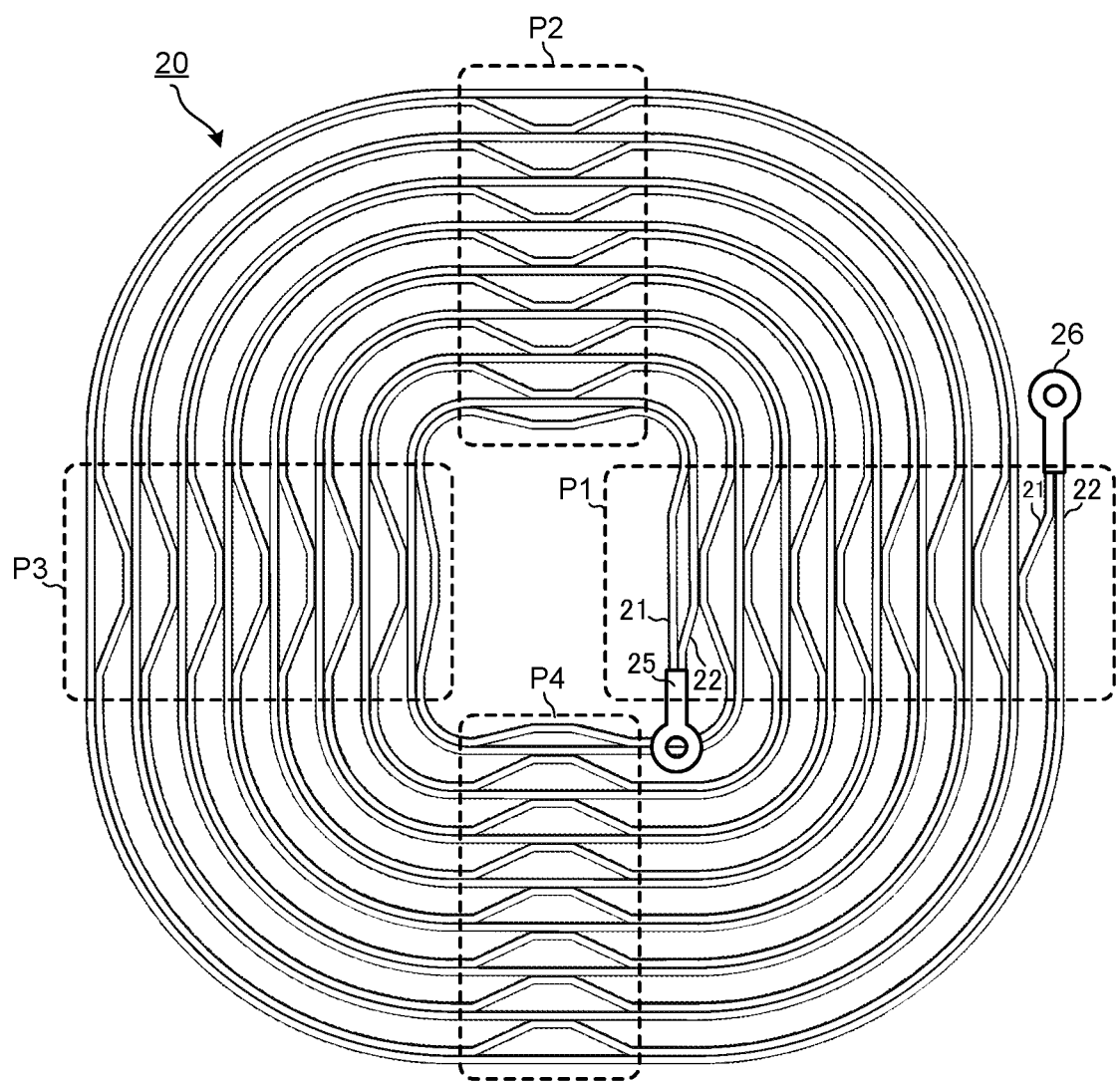
FIG. 4 is a plan view of a spiral-shaped coil (power reception side) of a second embodiment.

Next, a second embodiment will be explained with reference to FIG. 4. FIG. 4 is a plan view illustrating a coil (vehicle side) of the second embodiment. Note that in the second embodiment, the same constituent elements as those of the first embodiment are denoted by the same reference signs, and explanation thereof will be omitted.

As illustrated in FIG. 4, a coil 20 of the second embodiment, whose outer shape is formed in, for example, a substantially square shape (corner portions are rounded) of 400 mm×400 mm, is installed on a secondary side (power reception side), specifically, for example, at the bottom of an EV. A formation manner of regions A to C is similar to that of the first embodiment.

In this example, the Litz wires 21, 22 are wound in a spiral shape so as to form the outer shape in a quadrangle (the four corner portions are rounded in such a case where the outer shape has a substantially square shape as described in this example), and other than the above, the outer shape may be formed in a polygonal shape such as a substantially triangular shape, a substantially pentagonal shape, a substantially hexagonal shape, or a substantially octagonal shape, a substantially D-shaped shape, a circular shape, or the like.

According to the second embodiment as described above, forming the outer shape of the coil 20 in, for example, a substantially square shape having length and width dimensions of 400 mm×400 mm enables application as the vehicle-mounted coil 20 coping with use in the charging station of the first embodiment.

Figure 5:
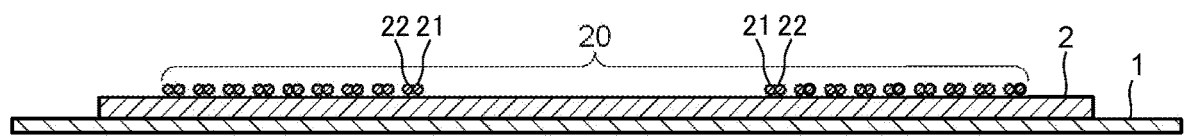
FIG. 5 is a sectional view of a non-contact power supply device using the coil of the above first or second embodiment.

A non-contact power supply device using each of the coils 20 (para hybrid winding) illustrated in the above first and second embodiments includes a board 1 such as an aluminum plate, a magnetic core plate 2 disposed on an upper surface of the board 1, and the coil 20 disposed on an upper surface of the magnetic core plate 2, as illustrated in FIG. 5.

This allows the non-contact power supply device on the primary side or the non-contact power supply device on the secondary side to be formed, for example. Moreover, in order to fix a position of the coil 20 on the magnetic core plate 2, the upper surface of the magnetic core plate 2 may be coated with a molding resin or the like. Further, the magnetic core plate 2 itself may be provided with a groove for retaining a shape of the coil 20.

As the board 1, a plate material of an insulating material such as a resin plate may be used other than a metal plate such as the above aluminum plate. Note that the magnetic core plate 2 is disposed on the board 1 and the coil 20 is disposed thereon in the above-described example, and the coil 20 may be disposed directly on the board 1, and moreover, the magnetic core plate 2 may be disposed on the coil 20.

When the coil 20 is thus moved on the magnetic core plate 2, bonding the abutting portions of the Litz wires 21, 22 to each other in advance causes a shape of the coil 20 to be retained and variations in inductance to be reduced, resulting in obtaining good handleability (workability of removal work from the winding jig, conveying work, and the like during coil manufacturing).

Figure 6:
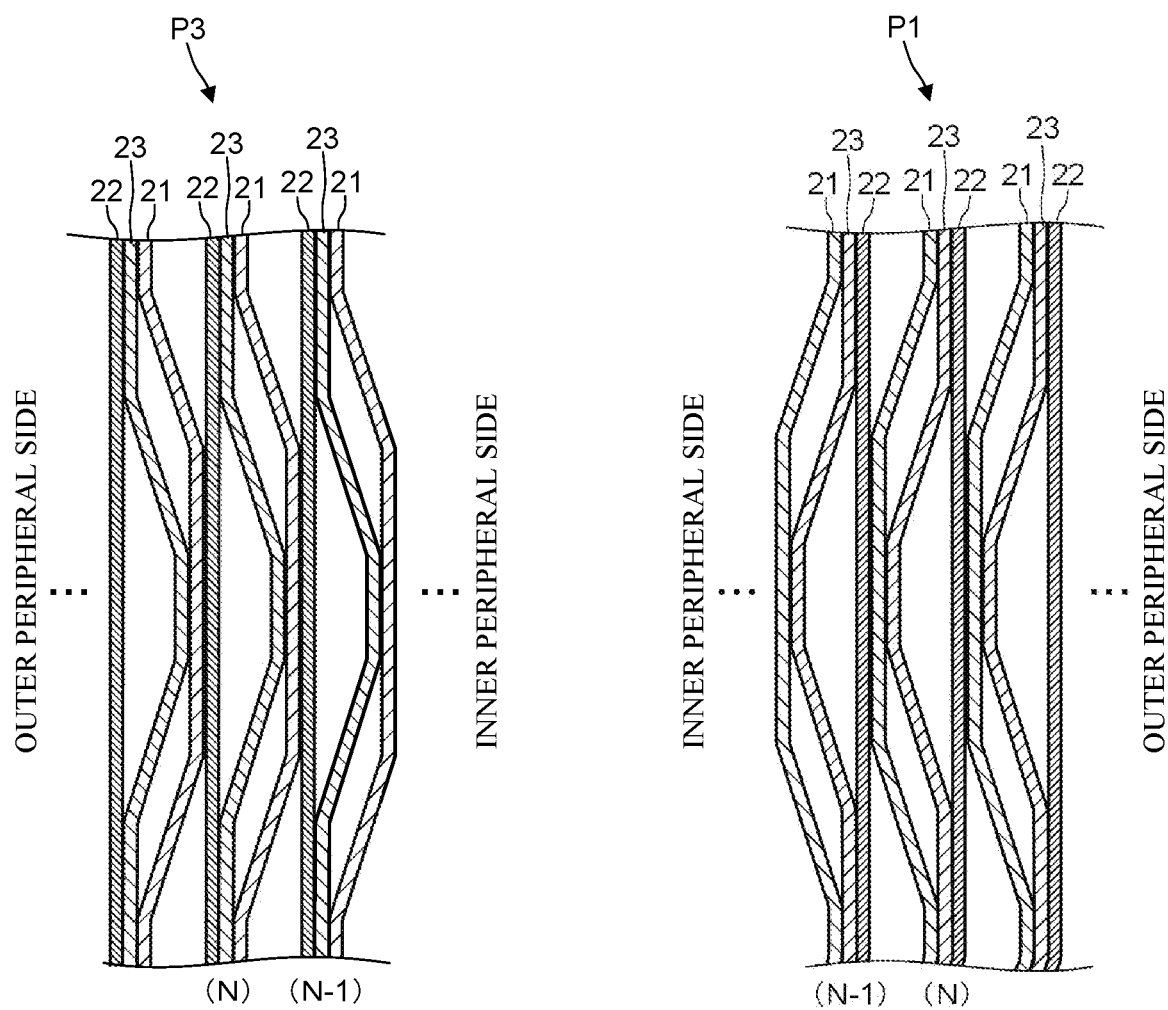
FIG. 6 is an enlarged view illustrating the other embodiment of a coil.

In the above embodiments, the two Litz wires 21, 22 are set as a pair, and as illustrated in FIG. 6, line lengths may be adjusted by using three Litz wires 21, 22, 23 and among them, disposing the Litz wire 22 on the outer peripheral side at regular intervals and making the Litz wires 21, 23 on the inner peripheral side which are disposed in the interval of the Litz wire 22 meander.

While certain embodiments of the present invention have been described, the above embodiments have been presented by way of example only, and are not intended to limit the scope of the inventions. Indeed, the novel embodiments described above may be embodied in a variety of other forms; furthermore, various omissions, substitutions, and changes may be made without departing from the spirit of the inventions. The inventions described in the accompanying claims and their equivalents are intended to cover the above forms or modifications as would fall within the scope and spirit of the inventions.

What is claimed is:

1. A coil in which a first electric wire on an innermost peripheral side of the coil and a second electric wire on an outermost peripheral side of the coil are wound side by side to form each turn of the coil and to connect ends of the first electric wire and the second electric wire with each other, the coil comprising:
a first region where the first electric wire of an Nth turn (N being an integer of 1 or more) excluding the innermost peripheral side of the coil abuts against the second electric wire of an adjacent turn and is separated from the second electric wire of the Nth turn,
a second region where the first electric wire of the Nth turn crosses in a direction of being wound forward from a first section abutting against the second electric wire of the Nth turn to a first section abutting against the second electric wire of an (N−1)th turn or an (N+1)th turn and the first electric wire of the Nth turn is separated from the second electric wire of the Nth turn; and
a third region where the first electric wire of the Nth turn crosses in a direction of being wound forward from a second section abutting against the second electric wire of the (N−1)th turn or the (N+1)th turn to a second section abutting against the second electric wire of the Nth turn and the first electric wire of the Nth turn is separated from the second electric wire of the Nth turn.

2. The coil according to claim 1, wherein the first region, the second region, and the third region are disposed in an order of the second region, the first region, and the third region.

3. The coil according to claim 1, wherein the first region is provided in partial zones in one round of winding.

4. The coil according to claim 1, wherein the first region is disposed for each certain angular range divided at regular intervals from a winding center in a radial direction.

5. The coil according to claim 1, wherein sections where the first electric wire and the second electric wire abut against each other are bonded.

6. A non-contact power supply device comprising:
a board made of metal or made of resin; and
the coil according to claim 1, which is disposed directly on the board or with a magnetic core plate interposed therebetween.

\* \* \* \* \*